(12) United States Patent
Jones et al.

(10) Patent No.: US 8,734,088 B2
(45) Date of Patent: May 27, 2014

(54) VARIABLE STATOR VANE

(75) Inventors: Gareth Jones, Leicester (GB); Clive Lockwood, Derby (GB); Adam Bagnall, Derbyshire (GB)

(73) Assignee: Rolls-Royce PLC, London (GB)

( * ) Notice: Subject to any disclaimer, the term of this patent is extended or adjusted under 35 U.S.C. 154(b) by 616 days.

(21) Appl. No.: 12/379,466

(22) Filed: Feb. 23, 2009

(65) Prior Publication Data

US 2009/0269187 A1 Oct. 29, 2009

(30) Foreign Application Priority Data

Apr. 23, 2008 (GB) .................................. 0807359.5

(51) Int. Cl.
*F04D 31/00* (2006.01)

(52) U.S. Cl.
USPC ........... 415/116; 415/115; 415/159; 415/160; 415/162

(58) Field of Classification Search
USPC ........................... 415/115, 116, 159, 160, 162
See application file for complete search history.

(56) References Cited

U.S. PATENT DOCUMENTS

| 3,123,283 | A |   | 3/1964 | Leis |   |
|---|---|---|---|---|---|
| 3,864,058 | A | * | 2/1975 | Womack | 416/97 R |
| 4,856,962 | A | * | 8/1989 | McDow | 415/115 |
| 7,967,556 | B2 | * | 6/2011 | Gummer | 415/144 |
| 2006/0062499 | A1 | * | 3/2006 | Boyd | 384/100 |

FOREIGN PATENT DOCUMENTS

| CA | 1115639 |    | 1/1982 |
|---|---|---|---|
| EP | 1 998 025 | A1 | 12/2008 |
| GB | 1012909 |    | 12/1965 |
| GB | 2 210 935 | A  | 6/1989 |

OTHER PUBLICATIONS

Oct. 20, 2010 Search Report issued in European Patent Application No. 09 25 0411.

* cited by examiner

*Primary Examiner* — Thao X Le
*Assistant Examiner* — Geoffrey Ida
(74) *Attorney, Agent, or Firm* — Oliff PLC

(57) ABSTRACT

A variable stator vane in a gas turbine engine has a journal provided with a circumferential recess. An aperture extends from the recess to a face of the journal directed towards the aerofoil portion of the vane. In operation of the engine, heated air, for example from a downstream compressor stage of the engine is admitted to the recess and flows through the aperture to, for example, the pressure surface of the aerofoil portion. The aerofoil portion is thereby heated, so preventing ice accretion on the vane.

22 Claims, 1 Drawing Sheet

VARIABLE STATOR VANE

This invention relates to a variable stator vane, and particularly, although not exclusively, to such a vane in the form of a variable inlet guide vane of a gas turbine engine.

Variable stator vanes are mounted in a gas turbine engine in a manner which enables them to be pivoted about an axis extending generally lengthwise of the vane, so that the vanes can be turned about the axis to vary their angle of incidence with respect to the incoming air. This enables the vanes to be positioned appropriately for the prevailing operating conditions of the engine.

Variable stator vanes, particularly those situated at the engine inlet, are prone to the accretion of ice on them. This can adversely affect the aerodynamic properties of the vane, and also fragments of accumulated ice may detach from the vane and cause damage to downstream components of the engine. It is therefore desirable to avoid such ice accretion.

According to the present invention there is provided a variable stator vane comprising an aerofoil portion having at one end a journal for supporting the vane in a support structure, the journal having a circumferential recess and an aperture extending from the recess to a face of the journal directed towards the aerofoil portion; whereby heated air admitted to the recess is discharged from the aperture towards the aerofoil portion.

A vane in accordance with the present invention can thus be heated during operation of the engine in which it is installed, so preventing the formation of ice on the vane, or melting any ice which has formed.

The aperture may be configured to discharge air towards the pressure side of the aerofoil portion, and may therefore be disposed adjacent to the pressure side. The aperture may open at a port in the face of the journal directed towards the aerofoil portion, and the port may extend into a transition surface at which the surface of the aerofoil portion merges into the adjacent face of the journal. The port may be situated adjacent the leading edge of the aerofoil portion.

The journal may be provided with sealing rings disposed on opposite sides of the recess, for providing a seal between the journal and a bearing surface provided in the support structure. The sealing rings may comprise carbon rings.

The circumferential recess may be defined between cylindrical portions of the journal, the cylindrical portions having the same diameter as each other. As a result, the pressure applied to the cylindrical portions by heated air within the circumferential recess exerts an equal force on each cylindrical portion.

The stator vane may be a variable inlet guide vane.

The present invention also provides a gas turbine engine having a variable stator vane as defined above, the gas turbine engine having a support structure provided with a cylindrical cavity in which the journal is disposed. The support structure may have a passage for admitting heated air to the cavity at the location of the circumferential recess in the journal. The gas turbine engine may be provided with means for conveying the heated air from a source of heated air to the passage. The source of heated air may be a compressor stage of the gas turbine engine.

For a better understanding of the present invention, and to show more clearly how it may be carried into effect, reference will now be made, by way of example, to the accompanying drawings, in which.

Figure 1:
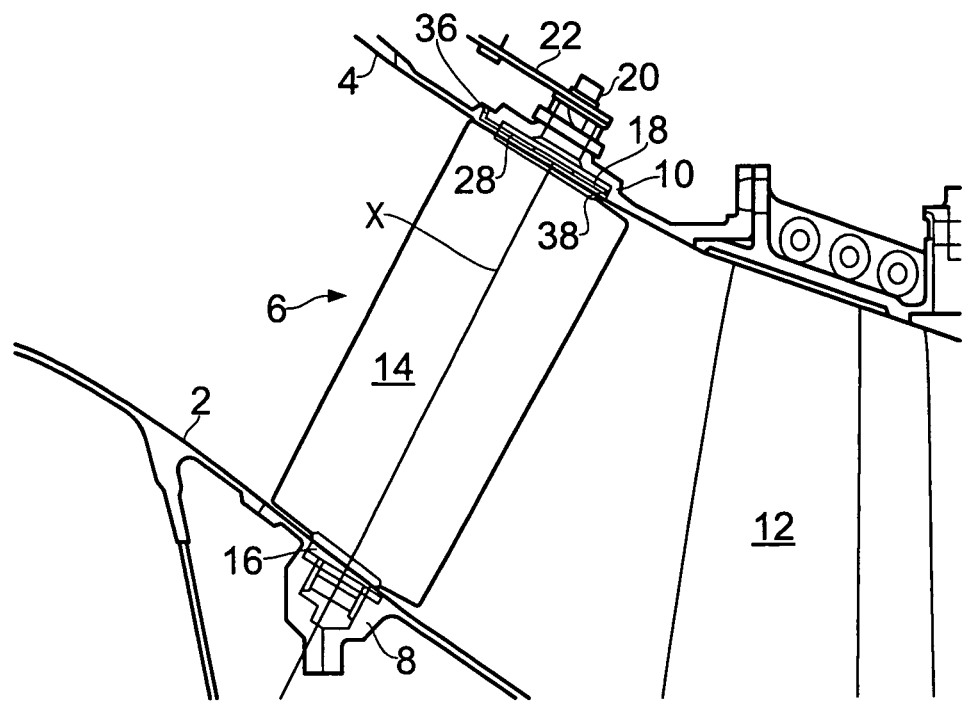
FIG. 1 shows a variable inlet guide vane installed in a gas turbine engine.

FIG. 1 shows an intake region of a compressor stage, for example an intermediate pressure stage, of a gas turbine engine. A flow path for working fluid is defined by an inner casing 2 and an outer casing 4. A variable inlet guide vane 6 is supported at each end by support structures in the form of bearing housings 8, 10 forming part of the inner and outer casings 2, 4. Downstream of the vane 6 there is a rotor represented by a blade 12, and it will be appreciated that further stator vanes and rotors follow the rotor 12.

It will be appreciated that the vane 6 is one of an array of vanes distributed around the axis of the engine. Each vane has an aerofoil portion 14 which extends across the path of the working fluid (air). At each end, the aerofoil portion has a journal 16, 18 which is supported in the respective bearing housing 8, 10. At its radially outer end, the vane 6 has a spindle 20 to which an operating arm 22 is rigidly fastened. The operating arms 22 are connected at their ends away from the spindle 20, to a common ring which surrounds the engine and which can be turned about the axis of the engine to pivot the vanes 6 about their respective lengthwise axes X.

Figure 2:
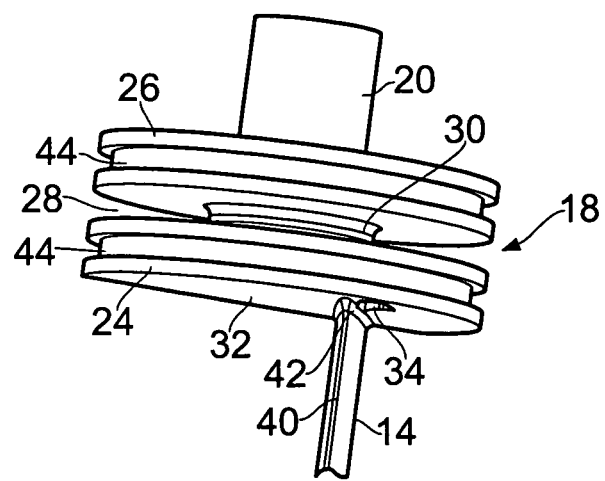
FIG. 2 shows, on an enlarged scale, part of the variable inlet guide vane of FIG. 1.

The radially outer journal 18 is shown in more detail in FIG. 2. It will be appreciated that the journal 18 comprises two cylindrical portions 24, 26 which define between them a circumferential recess 28. The bottom of the recess is defined by a cylindrical connecting portion 30 which extends between the circumferential portions 24, 26 and is co-axial with the spindle 20. The spindle 20 extends from one face of the radially outer cylindrical portion 26, and the aerofoil portion 14 extends from the inwardly directed face 32 of the radially inner cylindrical portion 24.

An aperture 34 in the form of a nozzle extends through the radially inner cylindrical portion 24, and so provides communication between the recess 28 and the flow path through the engine. As shown in FIG. 1, the bearing housing 10 has a passage 36 which extends from a cylindrical cavity 38 in the bearing housing 10 to the exterior of the casing 4. Although not shown, the passage 36 is connected by suitable pipe work to a downstream region of the compressor stage, for example to stage 8 of the intermediate pressure compressor so that pressurized, and therefore heated, IP8 air is supplied to the cavity 38. The passage 36 opens into the cavity 38 at the location of the circumferential recess 28 in the journal 18 so that the heated air can enter the recess 28 from the passage 36 and then exit the recess 28 through the nozzle 34. Control means may be provided for controlling the flow rate of the heated air, or for closing the passage 36.

The nozzle 34 opens at the face 32 at a port situated adjacent the aerofoil portion 14. As shown in FIG. 2 the port of the aperture 34 is situated directly adjacent one side of the aerofoil portion 14, preferably the pressure side. The port is also situated close to the leading edge 40 of the aerofoil portion 14. In particular, it will be appreciated from FIG. 2 that the port of the aperture 34 extends into a transitional surface 42 over which the surface of the aerofoil portion 14 merges into the face 32 of the cylindrical portion 24.

It will be appreciated that, with appropriate control of the pressure of air admitted to the recess 28 and appropriate configuration of the nozzle 34, the hot air bleed from the IP8 compressor stage will be directed as a jet radially inwardly over the external surface, and specifically the pressure side, of the aerofoil portion 14. This will heat the aerofoil portion 14, so avoiding the accumulation of ice. It will be appreciated that the nozzle 34 may be differently configured, or may be one of an array of two or more nozzles, to provide a desired flow pattern of heated air over the external surface of the aerofoil portion 14.

The cylindrical portions 24, 26 are provided with grooves 44 for receiving sealing rings, for example of carbon, for providing a seal between the cylindrical portions 24, 26 and the cylindrical wall of the cavity 38, so as to prevent unwanted air leakage from the recess 28.

The cylindrical portions 24, 26 have the same diameter as each other, and so present the same surface area to the pressurized air in the recess 28. Consequently, the loading on the journal 18 from the pressurized air is equal in both directions, avoiding the imposition of any radially inward or outward loading on the vane 6.

The invention claimed is:

1. A variable stator vane forming part of a circumferential array of vanes, the variable stator vane comprising:
 an aerofoil portion having a span, and, at one end thereof, a journal configured to support the variable stator vane in a support structure located at a radially outer end of the aerofoil portion, the journal having
 a circumferential recess configured to admit heated air, a face, and
 an aperture extending from the circumferential recess to the face in a direction towards the aerofoil portion, the aperture being separate from the aerofoil portion wherein
 the heated air is discharged into a main flowpath from the aperture in a spanwise direction radially inwardly over, and substantially parallel to, an external surface of the aerofoil portion wherein the journal includes a first cylindrical portion and a second cylindrical portion, and the circumferential recess is disposed between the first cylindrical portion and the second cylindrical portion.

2. The variable stator vane as claimed in claim 1, wherein the aperture is configured to discharge heated air over a pressure side of the aerofoil portion.

3. The variable stator vane as claimed in claim 2, wherein the aperture is situated adjacent to the pressure side of the aerofoil portion.

4. The variable stator vane as claimed in claim 1, wherein the aperture opens at a port in the face of the journal directed towards the aerofoil portion, the port extending into a transition surface between the external surface of the aerofoil portion and the face of the journal.

5. The variable stator vane as claimed in claim 4, wherein the port is situated adjacent to a leading edge of the aerofoil portion.

6. The variable stator vane as claimed in claim 1, wherein the journal is provided with sealing rings disposed on opposite sides of the circumferential recess.

7. The variable stator vane as claimed in claim 6, wherein the sealing rings are carbon rings.

8. The variable stator vane as claimed in claim 1, wherein the circumferential recess is defined between cylindrical portions of the journal, the cylindrical portions having a same diameter.

9. The variable stator vane as claimed in claim 1, wherein the variable stator vane is a variable inlet guide vane.

10. A gas turbine engine comprising:
 the variable stator vane in accordance with claim 1, wherein
 the gas turbine engine has a support structure provided with a cylindrical cavity in which the journal is disposed.

11. The gas turbine engine as claimed in claim 10, wherein the support structure has a passage for admitting heated air to the cylindrical cavity at a location adjacent the circumferential recess.

12. The gas turbine engine as claimed in claim 11, wherein means is provided for conveying the heated air from a source of heated air to the passage.

13. The gas turbine engine as claimed in claim 12, wherein the source of heated air is a compressor stage of the gas turbine engine.

14. A variable stator vane for use with heated air, comprising:
 an aerofoil portion defining a radially outer end and an external surface, the external surface having a span;
 a journal disposed at the radially outer end of the aerofoil portion, the journal defining:
 a circumferential recess configured to admit the heated air,
 a face disposed radially inward of the circumferential recess, and
 an aperture extending from the circumferential recess to the face and being separate from the aerofoil portion such that the heated air admitted to the circumferential recess enters the aperture and is discharged into a main flow path from the aperture in a spanwise direction radially inward over, and substantially parallel to, the external surface of the aerofoil portion; and
 a support structure that supports the aerofoil portion and the journal wherein the journal includes a first cylindrical portion and a second cylindrical portion, and the circumferential recess is disposed between the first cylindrical portion and the second cylindrical portion.

15. The variable stator vane as claimed in claim 14, wherein the aperture is configured to discharge heated air over a pressure side of the aerofoil portion.

16. The variable stator vane as claimed in claim 15, wherein the aperture is situated adjacent to the pressure side of the aerofoil portion.

17. The variable stator vane as claimed in claim 14, wherein the aperture opens at a port in the face of the journal directed towards the aerofoil portion, the port extending into a transition surface between the external surface of the aerofoil portion and the face of the journal.

18. The variable stator vane as claimed in claim 17, wherein the port is situated adjacent to a leading edge of the aerofoil portion.

19. The gas turbine engine as claimed in claim 14, wherein the support structure has a passage for admitting heated air to the cylindrical cavity at a location adjacent the circumferential recess.

20. The gas turbine engine as claimed in claim 19, wherein means is provided for conveying the heated air from a source of heated air to the passage.

21. The variable stator vane as claimed in claim 1, wherein the circumferential recess has a bottom surface that is defined by a cylindrical connecting portion that connects the first cylindrical portion to the second cylindrical portion.

22. The variable stator vane as claimed in claim 1, wherein the first cylindrical portion includes a first groove for receiving a first sealing ring, and the second cylindrical portion includes a second groove for receiving a second sealing ring.

\* \* \* \* \*